F. B. MILES.

STEAM HAMMER.

No. 7,248. Reissued Aug. 1, 1876.

Witnesses
Harry Hopson Jr
Harry Smith

Frederick B. Miles
by his Attorneys
Howson & Sons

UNITED STATES PATENT OFFICE.

FREDERICK B. MILES, OF PHILADELPHIA, PENNSYLVANIA, ASSIGNOR TO FERRIS & MILES, OF SAME PLACE.

IMPROVEMENT IN STEAM-HAMMERS.

Specification forming part of Letters Patent No. 137,313, dated April 1, 1873; reissue No. 7,248, dated August 1, 1876; application filed June 26, 1876.

*To all whom it may concern:*

Be it known that I, FREDERICK B. MILES, of Philadelphia, in the county of Philadelphia and State of Pennsylvania, have invented certain Improvements in Steam-Hammers, of which the following is a specification:

My invention, although adapted to steam-hammers generally, is especially applicable to the steam-hammers to be used for the stamping of metal into dies or molds, in place of ordinary drop-hammers, which have been heretofore operated by belts, pulleys, or gearing of a more or less complicated and self-destructive character.

The main object of my invention is to so connect together the main or slide valve or valves of a steam-hammer, with a regulating or shut-off valve, that they must operate simultaneously or in a certain definite relation to each other, so as to control the ram of the hammer and effect a certain definite result, which can be varied only by varying the relations between the valves.

Figure 2:
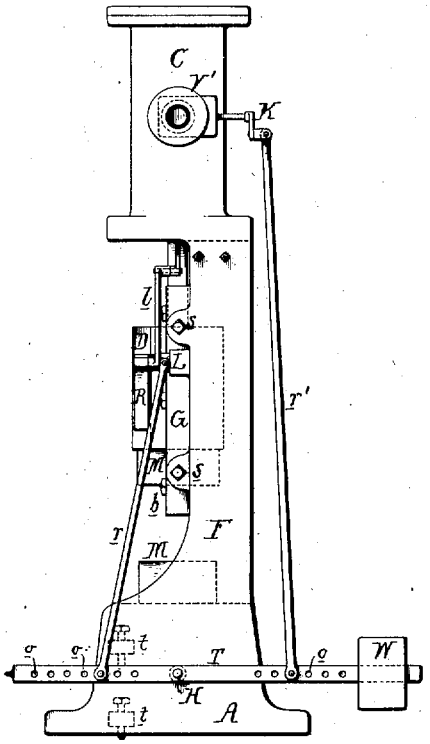
Figure 1:
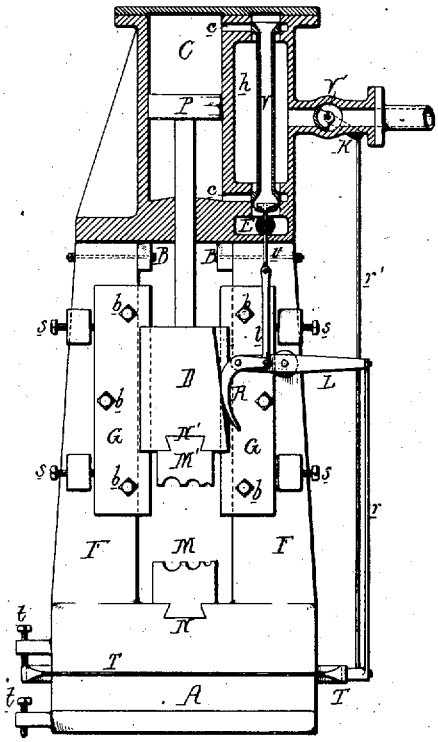

In the accompanying drawing, Figure 1 is a front elevation, partly in section, of a machine embodying my invention, and Fig. 2 a side view of the same.

A is the base or anvil, having a notch, N, into which the lower portion of a die or mold, M, is fitted and secured. On the base are the frames F F supporting the cylinder C, and D is the ram connected to the piston P of the said cylinder. To a notch, N′, at the lower end of the ram D is secured the upper die or mold M′, which is made to match the mold below. G G are adjustable guide-plates adapted to vertical grooves in the ram, the plates being secured to the frames F F by bolts *b*, and rendered adjustable on the said frames by set-screws *s s*, or they may be adjusted by wedges or other convenient devices, so as to insure the proper coincidence of the two dies or molds. B B are bumpers, consisting of pads of rubber or metal springs, or other elastic or yielding mediums, and so arranged as to prevent accident to the machine by receiving the ram when it is driven to the top of the stroke, an accident which can only occur when the appliances described hereafter are disarranged.

In the steam-chamber *h h* is a slide-valve, V, whose office is to direct the admission and exhaustion of steam through ports *c c* above and below the piston P, as required. The valve is made in the form of a tube, with enlarged ends accurately turned and fitted to cylindrical bearings at the top and bottom of the cylinder, these bearings being bored perfectly true and being of the same diameter, so that the valve shall be perfectly balanced.

Any other form of balanced slide-valve will serve the desired purpose, but I prefer that above described.

The exhaust steam is first directed into the chamber E, whence it is carried off by a suitable pipe.

V′ is the regulating or shut-off valve, through which all steam admitted to the chamber *h* of the main valve must pass. Whatever devices may be used for operating these valves V and V′ they must be so connected together that they shall operate simultaneously or in certain definite relation to each other, for in this consists the main feature of my invention. As shown in the drawing, the valves are operated by a lever or handle, T, which is pivoted to the fulcrum-pin H on the base A. This treadle or lever is connected on one side of its fulcrum by the rod *r*, lever L, and rod *l*, to the stem *v* of the main valve, and on the opposite side of the fulcrum by a rod, *r′*, to the arm K of the regulating or shut-off valve V′, the treadle or lever being provided with a number of holes, *o*, or other devices by which the points of connection of the rods *r* and *r′* with the treadle may be readily changed.

Adjustable screw-stops *t t* are arranged on the base A for regulating the throw of the treadle T, which, when not pressed down, is maintained by a weight, W, in contact with the upper screw-stop.

The movement of the slide-valve V may be rendered automatic by means of an inclined plane on the ram, and a rocker, R, pivoted to the lever L, or when automatic action is not required the valves may be connected directly to the lever L or to the treadle. Any other mode of conveying motion to the valve V may be employed, providing the connection between it and the regulating-valve V′ be maintained, the object in all cases being to insure a concerted action of the two valves in regulating the admission of steam to the cylinder.

Operation: We will suppose the ram D to be at its lowest point, the upper die being in contact with the lower die, and the treadle or lever T, owing to its weight W, being in contact with the upper screw-stop *t*. When these parts are in the position stated, the regulating-valve V′ must be just closed, so that no steam can gain access to the chamber *h*, and the valve V must be just on the point of closing the lower port *c*, this relative position of the valves being determined by a proper adjustment of the length of the rods *r r′*. The valves being now set, steam is admitted to the regulating-valve, but cannot pass the same. The upper stop *t* is therefore screwed down, so as to depress the treadle, until the regulating-valve is slightly open, and a small quantity of steam enters the chamber *h*, and thence passes through the very-slightly-opened lower port *c* into the cylinder, below the piston, in sufficient quantity to raise the ram. The machine is now ready for action, and the operator places the metal on the lower die M, and with his foot presses down the treadle T against the lower screw-stop *t*. This movement of the treadle opens the regulating-valve, more or less, according to the distance to which the lower end of the rod *r′* has been adjusted from the fulcrum-pin H of the said treadle. By the same movement the slide-valve V is raised, thereby admitting steam to the cylinder above the piston, and allowing that below it to escape into the exhaust-chamber E, when the ram will fall, partly by its own gravity, and that of the piston and piston-rod, and partly owing to the pressure of steam on the top of the piston. The force of the blow will depend upon the volume of steam admitted to the top of the piston, and the amount of steam thus admitted to the cylinder will depend upon the distance to which the lower end of the rod *r* has been adjusted from the fulcrum-pin H. When the operator releases the treadle, the latter is again brought into contact with the upper screw-stop *t* by the weight W, and the valves assume their original relative positions, the valve V descending, and admitting steam to the cylinder beneath the piston, and permitting the steam above to pass down the interior of the cylindrical valve to the exhaust-chamber, and thence through the exhaust-pipe, when the piston P will rise, impelled by the steam beneath it, and the ram would strike violently against the bumpers B B, and, perhaps, seriously damage the machine, in the absence of the regulating-valve V′, for as the treadle rises this valve closes, thereby cutting off the supply of steam, and the consequence of this is that the ram rises with diminishing velocity, and when it reaches the limit of its upward stroke is supported by the steam beneath the piston until the treadle is again pressed down.

If the machine be furnished with automatic devices, as described above, the blows of the ram will be repeated as long as the treadle is held down; but the length of the rod *r* must be so adjusted that the rocker R will not entirely close the lower port *c* when the treadle T is released, and the ram D rises.

The operator, by adjusting the lower ends of the rods *r r′* on the treadle or lever T, can obtain the result he has found best suited for each kind of work. The series of holes *o* is preferred for effecting this adjustment, as there is always a certainty that the same holes will produce the same results, as regards the force of the blows struck by the drop.

I claim as my invention—

1. The combination, in a steam-hammer, of a main valve and regulating or shut-off valve, with devices by which the within-described simultaneous and co-operative action of the two valves is insured, all substantially as set forth.

2. The combination, in a steam-hammer, of a main valve, V, and a regulating or shut-off valve, V′, with a lever or treadle, T, connected to both valves, for the simultaneous operation of the same, substantially as herein set forth.

3. The combination of the said main valve and regulating-valve, a lever for operating the same, and devices whereby the connections of the lever with the said valves may be adjusted, and the relative positions of the valves altered, all substantially as specified.

4. The combination of the valves, the treadle or lever T, for operating the same, and the stops *t t*.

In testimony whereof I have signed my name to this specification in the presence of two subscribing witnesses.

FREDERICK B. MILES.

Witnesses:

HARRY HOWSON, Jr.,
HARRY SMITH.